W. ROSS.
Grain Drill.
No. 42,112.
Patented Mar. 29, 1864.
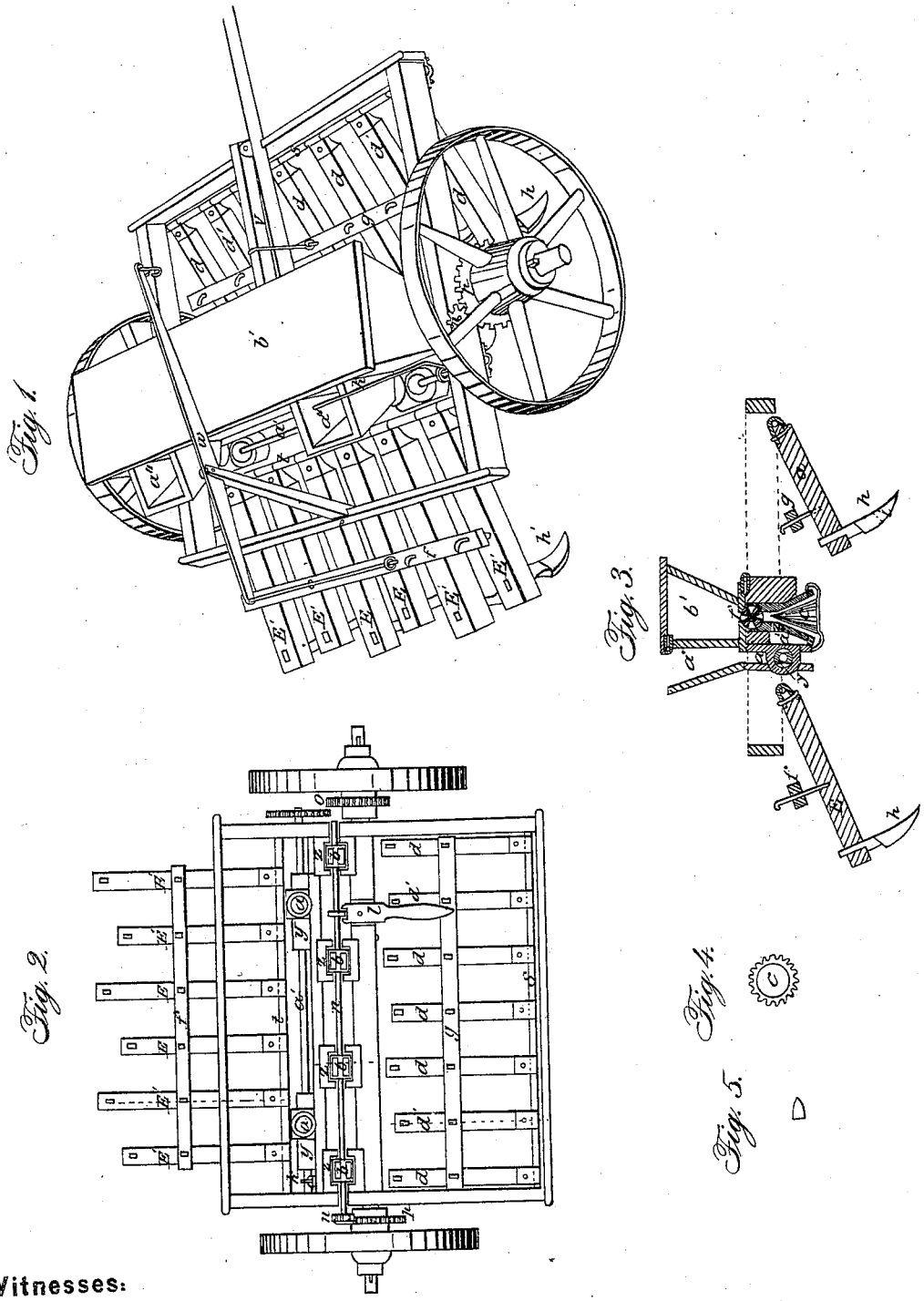

UNITED STATES PATENT OFFICE.

WALTER ROSS, OF OSHKOSH, WISCONSIN.

IMPROVEMENT IN GRAIN-DRILLS.

Specification forming part of Letters Patent No. 42,112, dated March 29, 1864.

*To all whom it may concern:*

Be it known that I, WALTER ROSS, of the city of Oshkosh, county of Winnebago, and State of Wisconsin, have invented new and useful Improvements in Seeding-Machines; and I do hereby declare that the following is a full, clear, and exact description of the construction and operation of the same, reference being had to the annexed drawings, making a part of this specification, in which—

Figure 1 is a perspective view; Fig. 2, a horizontal section and plan; Fig. 3, a longitudinal section cutting Fig. 2 through the dotted red line; Fig. 4, a section of fluted cone; Fig. 5, a section of cultivator-tooth.

I. *The cultivator.*—$d\ d'\ d\ d\ d\ d'\ d$ are arms secured to shaft S, with cultivator-teeth attached, as seen at $h$. $e'\ e'\ e\ e\ e'\ e'$ are arms secured to shaft $t'$, with cultivator-teeth attached as seen at $h'$. $g$ and $f$ are bars attached to cultivator-arms, and by means of levers $v$ and $w$ serve to raise and hold cultivator-teeth from ground. $h\ h'$ are cultivator-teeth. Fig. 5 is a section of same at $i$ in $h$, Fig. 3.

II. *The corn-planter.*—$a''\ a''$ are hoppers. $a\ a$ are conductors. $y\ y$ are buckets, and $a'$ is a shaft that revolves the buckets. $m$ is a cog-wheel secured to shaft $a'$. $o$ is a cog-wheel secured to hub of wheel, and $k$ is a lever that throws cog-wheel $m$ in and out of gear with cog-wheel $o$. $d'\ d'$ are cultivator-teeth that furrow the ground to receive the seed, and $e'\ e'\ e'\ e'$ are cultivator-teeth that follow and cover the seed when planted.

III. *The seed-sower.*—$b'$ is hopper-chest. $z\ z\ z\ z$ are conductors. $b\ b\ b\ b$ are buckets secured to shaft $r$ and revolve over conductors. $c$ is a fluted cone, Fig. 4 representing a section of bottom of $c$. $n$ is a cog-wheel secured to end of shaft $r$. $p$ is a cog-wheel secured to hub of wheel. $l$ is a lever to throw cog-wheel $n$ in and out of gear with cog-wheel $p$.

To enable others skilled in the art to make and use my invention, I will proceed to describe its construction and operation.

The cultivator-teeth are brought to an angle in front, the side sloping back with a moderate swell, as seen in Fig. 5, thereby producing a cultivator-tooth that requires less power to drive and one that will perform equally as good work as those in ordinary use.

The cultivators are constructed in the ordinary forms where cultivators are set to arms and used with seed-sowers. In this machine a set of cultivators are attached to frame ahead of seed-sower for the purpose of leveling and preparing the ground for the seed. The seed being sown, another set of teeth attached to frame in rear of seed-sower serves to cover the seed.

For the corn-planter two perpendicular tubes or conductors, $a\ a$, are constructed of metal, with a transverse cylinder cutting the tube or conductor in the center at right angles. Into these cylinders are inserted the buckets $y\ y$. These buckets are secured to shaft $a'$ by set-screws, and may be of a capacity for maize, broom-corn, or sorghum, and worked equally successful with either. Over the conductors are erected hoppers for the reception of seed. The shaft $a'$ and buckets $y\ y$ are operated by means of cog-wheel $m$ gearing into cog-wheel $o$, $o$ being secured to hub of one of the wheels, thereby, when the machine is set in operation, giving the necessary motion.

*The corn-planter in operation.*—First, the ground is furrowed to receive the seed by cultivator-teeth attached to arms $d'\ d'$; second, the seed is deposited in hoppers $a''\ a''$, and by means of the conductor and buckets are dropped at uniform distances in the furrows, and, third, are covered by the cultivator-teeth attached to arms $e'\ e'\ e'\ e'$, casting the ground from each side of the furrow made by cultivators $d'\ d'$.

The seed may be dropped by any of the known methods.

For the broadcast seed-sower the tubes or conductors $z\ z\ z\ z$ are made of metal, with semi-cylindrical openings in top for buckets $b\ b\ b\ b$, and with an inverted-tunnel-shaped discharge with a fluted cone, $c$, inserted in and secured thereto, leaving an opening between outside of cone and inside of tunnel. The grain is deposited in hopper-box $b$ and passes through opening in bottom thereof into buckets $b\ b\ b\ b$, and from thence discharged into conductor and onto the fluted cone, and sown broadcast, and by means of the fluted cone sown more uniform than by any other methods in common use. The buckets are operated by the shaft $r$ gearing into cog-wheel $p$, secured to hub of one of the wheels, and the necessary motion is secured when the machine is set in motion. The ground is leveled and prepared to receive the grain by the front cultivator, $d$, and is covered by the rear cultivator, $e$.

I do not claim the cultivators when used singly, nor the seed-sower, when in and of themselves singly considered, saving and reserving the fluted cone $c$ and the cultivator-teeth $h$ $h'$. By means of the fluted cone I claim a more uniform sowing of the seed, and more particularly when used on an incline or side hill. By means of the cultivator-teeth used in my machine less power is required to operate the cultivators and equally as good work is performed.

Having thus described my invention, the following is what I claim as new therein, and desire to secure by Letters Patent:

In combination with the hoppers $a''$ $a''$ and $b$, the cog-wheels $m$ $o$ and $n$ $p$ and levers $k$ $l$, all arranged and operating in the manner herein shown and described, for the purpose of adapting the machine to be readily converted from a grain-drill to a corn-planter, as explained.

WALTER ROSS.

Witnesses:
W. G. RITCH,
G. W. WASHBURN.